(12) United States Patent
Movshovich et al.

(10) Patent No.: US 6,888,578 B2
(45) Date of Patent: May 3, 2005

(54) METHOD AND SYSTEM FOR CROSS-LUMINANCE REDUCTION IN MULTI-STANDARD TELEVISION DECODERS

(75) Inventors: Aleksandr M. Movshovich, Santa Clara, CA (US); Brad A. Delanghe, San Jose, CA (US); Darren Neuman, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 528 days.

(21) Appl. No.: 10/146,639

(22) Filed: May 13, 2002

(65) Prior Publication Data

US 2003/0090596 A1 May 15, 2003

Related U.S. Application Data

(60) Provisional application No. 60/333,095, filed on Nov. 13, 2001.

(51) Int. Cl.[7] .............................. H04N 5/21; H04N 9/78
(52) U.S. Cl. ......................... 348/631; 348/665; 348/667
(58) Field of Search ................................ 348/631, 630, 348/663, 665, 667, 712, 713, 666, 624; H04N 8/21, 9/77, 9/78

(56) References Cited

U.S. PATENT DOCUMENTS

| | | | | |
|---|---|---|---|---|
| 5,099,315 A | * | 3/1992 | Koga et al. | 348/665 |
| 5,640,211 A | * | 6/1997 | Kawano et al. | 348/663 |
| 5,909,255 A | * | 6/1999 | Hatano | 348/663 |

* cited by examiner

*Primary Examiner*—Sherrie Hsia
(74) *Attorney, Agent, or Firm*—Sawyer Law Group LLP

(57) ABSTRACT

A method and system for correcting luma data and chroma data from a composite signal for a plurality of lines are disclosed. The method and system include correlating line data of the composite signal from a portion of the plurality of lines to provide a plurality of correlation signals. The method and system also include generating a chroma suppression signal based on the plurality of correlation signals. The chroma suppression signal indicates whether to suppress a portion of the chroma data. The chroma suppression signal indicates that the portion of the chroma data should be suppressed when a large luma transition and the chroma data being beneath a threshold are detected.

16 Claims, 4 Drawing Sheets

METHOD AND SYSTEM FOR CROSS-LUMINANCE REDUCTION IN MULTI-STANDARD TELEVISION DECODERS

CROSS-REFERENCE TO RELATED APPLICATION

This application is claiming under 35 USC §119(e) the benefit of provisional patent application Ser. No. 60/333,095, filed Nov. 13, 2001.

FIELD OF THE INVENTION

The present invention relates to computer systems, and more particularly to a method and system for providing cross-luminance reduction in a multi-standard television decoder.

BACKGROUND OF THE INVENTION

In graphics systems such as television system, a composite signal for a particular frame includes both luma (luminance) and chroma (chrominance/color) data. In order to process the signal, the luma and chroma are separated. The mechanism used to separate the luma and chroma data depends upon the standard with which the signal complies. Typically, however, the mechanism employs either filters or combing. More primitive methods of separating luma and chroma data use the fact that luma and chroma data are predominantly carried at different frequencies. Consequently, the filters pass a particular band of data around the luma or chroma signal.

Other conventional methods use a combing function. In combing, the composite is passed through one or more delays. Each delay provides a delay equivalent to one line. The data in the signal for a line which has been passed through the delay is combined with data for the signal that has not passed through the delay or which has been passed through fewer delays. Depending upon the standard with which the graphics data complies, a the chrominance data for particular line of data is out of phase with the chrominance data for another line of data by a certain amount. For example, in NTSC data, chrominance data for a particular line is 180° out of phase with chrominance data for a neighboring line. In PAL data, chrominance data for a particular line is 90° out of phase with chrominance data for a neighboring line. The signals for different lines are combined to remove chrominance data, leaving luma data. The luma data for a particular line can then be subtracted from the original composite signal to provide the chroma data for the line. Additional signal processing may then be performed in order to improve the separation of luma and chroma data.

Although the conventional mechanisms for separating luma and chroma data functions, one of ordinary skill in the art will readily recognize that errors are often made. In particular, the separation of luma data from chroma data is not complete. As a result, some luma data may be added into portions of the chroma data. Similarly, some chroma data may mistakenly be included in the luma data. Subsequent data processing meant to be performed only on luma or only on chroma data is performed on a mixture of luma and chroma data. When the data are provided for display, therefore, the quality of the image suffers.

Accordingly, what is needed is a system and method for improving the separation of luma data from chroma data in a composite signal. The present invention addresses such a need.

SUMMARY OF THE INVENTION

The present invention provides a method and system for correcting luma data and chroma data from a composite signal for a plurality of lines are disclosed. The method and system comprise correlating line data of the composite signal from a portion of the plurality of lines to provide a plurality of correlation signals. The method and system also comprise generating a chroma suppression signal based on the plurality of correlation signals. The chroma suppression signal indicates whether to suppress a portion of the chroma data. The chroma suppression signal indicates that the portion of the chroma data should be suppressed when a large luma transition and the chroma data being beneath a threshold are detected.

According to the system and method disclosed herein, the present invention detects instances where chroma data should be suppressed, allowing errors in the separation of chroma data from luma data to be corrected.

DETAILED DESCRIPTION OF THE INVENTION

The present invention relates to an improvement in the separation of luma and chroma data from a composite signal in a graphics system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for correcting luma data and chroma data from a composite signal for a plurality of lines are disclosed. The method and system comprise correlating line data of the composite signal from a portion of the plurality of lines to provide a plurality of correlation signals. The method and system also comprise generating a chroma suppression signal based on the plurality of correlation signals. The chroma suppression signal indicates whether to suppress a portion of the chroma data. The chroma suppression signal indicates that the portion of the chroma data should be suppressed when a large luma transition and the chroma data being beneath a threshold are detected.

The present invention will be described in terms of a particular system having particular components. However, one of ordinary skill in the art will readily recognize that this method and system will operate effectively for other systems and having different and/or other components performing similar functions. The present invention will also be described in the context of composite signals in accordance with particular standards. However, one of ordinary skill in the art will readily recognize that the present invention is consistent with the use of composite signals having different characteristics and/or comporting with other standards.

Figure 1:
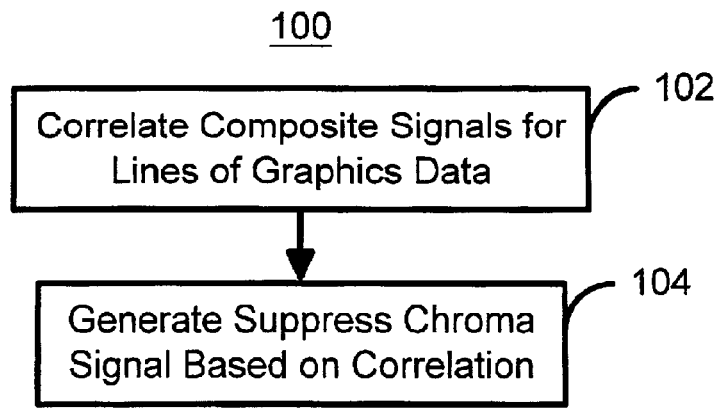
FIG. 1 is a high-level flow chart depicting one embodiment of a method in accordance with the present invention for detecting errors in the separation of luma and chroma data.

To more particularly illustrate the method and system in accordance with the present invention, refer now to FIG. 1, depicting a high-level flow chart of one embodiment of a method 100 in accordance with the present invention for detecting errors in the separation of luma and chroma data. The method 100 is preferably used with a composite signal for which the luma and chroma data are being separated. The composite signal is used to generate a frame, or scene, on a display having a plurality of lines. For example, the composite signal might be used to provide a frame being shown on a television screen, which can be decomposed into a number of horizontal lines. The data in the composite signal for a set of lines in the composite signal are correlated, via step 102. Preferably, step 102 correlates data for three adjacent lines. However, in an alternate embodiment, another number of lines can be used. In addition, the composite signal for each line in the set of lines is correlated with the composite signal for every other line in the set of lines in step 102. Step 102 preferably provides correlation signals for each comparison performed in step 102. At least a suppress chroma signal is generated from the correlation between the lines, via step 104. The suppress chroma signal indicates whether a portion of the chroma data for a particular line should be suppressed. The suppress chroma signal indicates that the chroma data should be suppressed when the luma data undergoes a large transition and the correlation indicates that the chroma signal is small, preferably below a particular threshold. The suppress chroma signal can then be used on a portion of the chroma data to suppress the portion of the chroma data, where appropriate.

Figure 2:
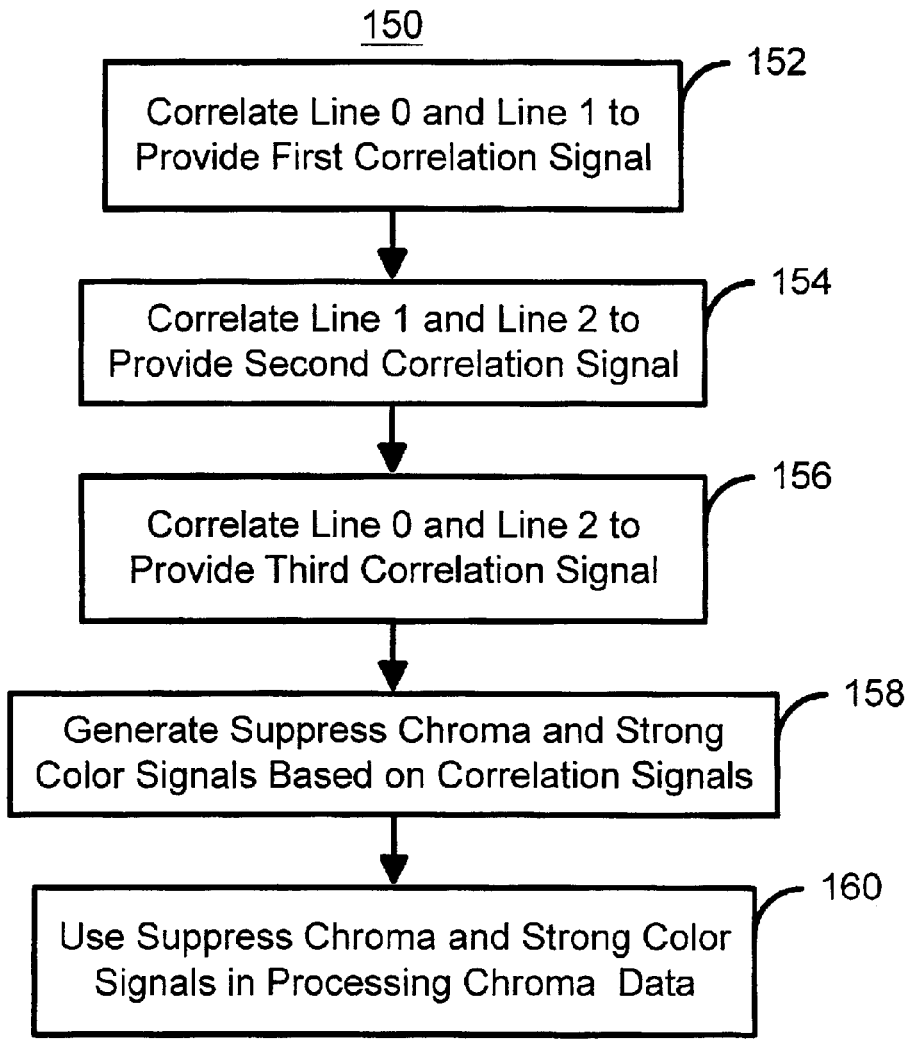
FIG. 2 is a flow chart depicting one embodiment of a method in accordance with the present invention for correcting the separation of luma and chroma data.

FIG. 2 is a flow chart 150 depicting one embodiment of a method in accordance with the present invention for correcting the separation of luma and chroma data. The method 150 is preferably used with a composite signal for which the luma and chroma data are being separated. The composite signal is used to generate a frame, or scene, on a display having a plurality of lines. For example, the composite signal might be used to provide a frame being shown on a television screen, which can be decomposed into a number of horizontal lines. A first line data of the composite signal is correlated with a first subsequent line data of the composite signal to provide a first correlation signal, via step 152. Preferably, step 152 is preferably performed by taking a number of samples of the first line (line 0), the same number of samples of the first subsequent line (line 1), multiplying each of the samples of the first line (line 0) with the corresponding sample of the first subsequent line (line 1) to provide a product, then adding the products to provide the first correlation signal.

The first line data is correlated with a second subsequent line data of the composite signal to provide a second correlation signal, via step 154. Preferably, step 154 is preferably performed by taking a number of samples of the first subsequent line (line 1), the same number of samples of the second subsequent line (line 2), multiplying each of the samples of the first subsequent line (line 1) with the corresponding sample of the second subsequent line (line 2) to provide a product, then adding the products to provide the second correlation signal.

The first line data is correlated with the second subsequent line data to provide a third correlation signal, via step 156. Preferably, step 156 is performed by taking a number of samples of the first line (line 0), the same number of samples of the second subsequent line (line 2), multiplying each of the samples of the first line (line 0) with the corresponding sample of the second subsequent line (line 2) to provide a product, then adding the products to provide the third correlation signal.

A chroma suppression signal and, in a preferred embodiment, a strong color signal are generated based on the first correlation signal, the second correlation signal and the third correlation signal, via step 158. The suppress chroma signal and the strong color signal are then used to process the data, via step 160. Thus, the chroma data are suppressed in some instances, but not in others. In a preferred embodiment, the chroma data are suppressed for portions of the line where the suppress chroma signal indicates the chroma data should be suppressed and the strong color signal does not indicate the presence of strong color, as described below.

The chroma suppression signal indicates whether to suppress a portion of the chroma data when a large luma transition and the chroma data being beneath a threshold are detected. A large luma transition occurs when there is a large difference (transition) in the luma data for a particular line. In a preferred embodiment, the chroma suppression signal is generated when there is a large transition in the luma data unless the certain conditions exist. The conditions for certain types of combing used in separating luma and chroma data for NTSC and PAL are listed in Table 1.

TABLE 1

| NTSC<br>3-Line Combing | NTSC<br>Top 2-Line<br>Combing | NTSC Bottom<br>2-Line Combing | PAL<br>3-Line Combing |
| --- | --- | --- | --- |
| \|A\| > CT and<br>A < 0<br>\|B\| > CT and<br>B < 0<br>\|C\| > CT and<br>C >= 0 | \|B\| > CT and<br>B < 0 | \|A\| > CT and<br>A < 0 | \|A + B\| < PT,<br>\|C\| > CT and C < 0 |

Where:
A = First Correlation Signal (correlation between line 0 and line 1);
B = Second Correlation Signal (correlation between line 1 and line 2);
C = Third Correlation Signal (correlation between line 0 and line 2);
CT = Correlation Threshold
PT = PAL Threshold In a preferred embodiment, the suppress chroma signal will also indicate that a portion of the chroma signal should be suppressed either when there is horizontal (single line) combing or when there is both horizontal combing and none of the conditions in Table 1 exist.

The conditions in Table 1 indicate the existence of chroma data in the original composite signal. For example, for NTSC data, chroma data for adjacent lines are out of phase by 180°. Thus, when correlating the first line and the first adjacent line, the product of samples taken at each line should be negative. If the sum of the products for samples from adjacent lines (e.g. line 0 and line 1 or line 1 and line 2) is negative and large, it indicates that there is a large amount of chroma data in the signal. Thus, if the signals A, B, or C are negative and have a magnitude above a threshold, then chroma data exists and the suppress chroma signal should not indicate that chroma data is to be suppressed. However, if the sum of the products either has a magnitude below a threshold or the wrong sign, then chroma data are either very small or nonexistent. Thus, the suppress chroma signal should indicate that a portion of the chroma data for the line should be suppressed. In a preferred embodiment, the suppress chroma signal is either 1 or 0, depending upon the luma transitions and the conditions described above. When the suppress chroma signal is 1, then a portion of the chroma data may be suppressed, as described below. When the suppress chroma signal is 0, then the chroma data are not suppressed.

The strong color signal indicates that the portion of the scene represented by a particular point definitely includes color (chroma data). In other words, the strong chroma indicates that there is a strong correlation between lines. In a preferred embodiment, the strong color signal indicates that strong color exists based on the first, second and third correlation signals and a strong color threshold that is higher than the correlation threshold. Table 2 describes the conditions which, in a preferred embodiment, will result in strong color for NTSC and PAL data in which luma and chroma are separated by various types of combing.

TABLE 2

| NTSC<br>3-Line Combing | NTSC<br>Top 2-Line<br>Combing | NTSC Bottom<br>2-Line Combing | PAL<br>3-Line Combing |
|---|---|---|---|
| $\|A\| > $ SCT and<br>$A < 0$ | $\|B\| > $ SCT and<br>$B < 0$ | $\|A\| > $ SCT and<br>$A < 0$ | $\|A + B\| < $ PT,<br>$\|C\| > $ SCT and<br>$C < 0$ |
| $\|B\| > $ SCT and<br>$B < 0$<br>$\|C\| > $ SCT and<br>$C >= 0$ | | | |

Where:
SCT = Strong Color Threshold

The conditions in Table 2 indicate a correlation between the composite signal for portions of certain lines and, therefore, the presence of a large amount of color for these portions of the lines. In a preferred embodiment, the strong color signal is 1 when any of the conditions in Table 2 are fulfilled and 0 otherwise.

As described above, the strong color and suppress chroma signals are used to further process the chroma and luma data. In a preferred embodiment, the strong color and suppress chroma signals will control the suppression of portions of the chroma data that has been separated from the luma data in the composite signal. In a preferred embodiment, a portion of the chroma data sill be suppressed when the suppress chroma signal is 1 and the strong color signal is 0. Otherwise, the chroma data will not be suppressed. However, another mechanism for determining whether to suppress the chroma data could also be used. Furthermore, the chroma data need not be completely suppressed and need not be suppressed only at a particular point at which it is determined that the chroma data should be suppressed. Instead, in a preferred embodiment, the chroma data is reduced in a range around a particular point. This is preferably accomplished by multiplying the chroma data by a signal that provides maximum reduction at the particular point and tapers off over a range. However, in a preferred embodiment, if the strong color signal is a 1 in the range over which the chroma suppression would taper off, then the suppression is immediately stopped in order to pass the strong chroma data.

Because the methods 100 and 150 allow for the detection of correlations in chroma data between lines, it can be determined whether chroma data should exist at a particular section of a particular line. Using correlation signals, therefore, suppress chroma and strong color signals may be developed and used to control the processing of chroma data that has been separated from luma data. As a result, errors which result in the mixing of chroma and luma data, such as the presence of luma data in chroma data where there should be little or no chroma data, can be accounted for.

Figure 3:
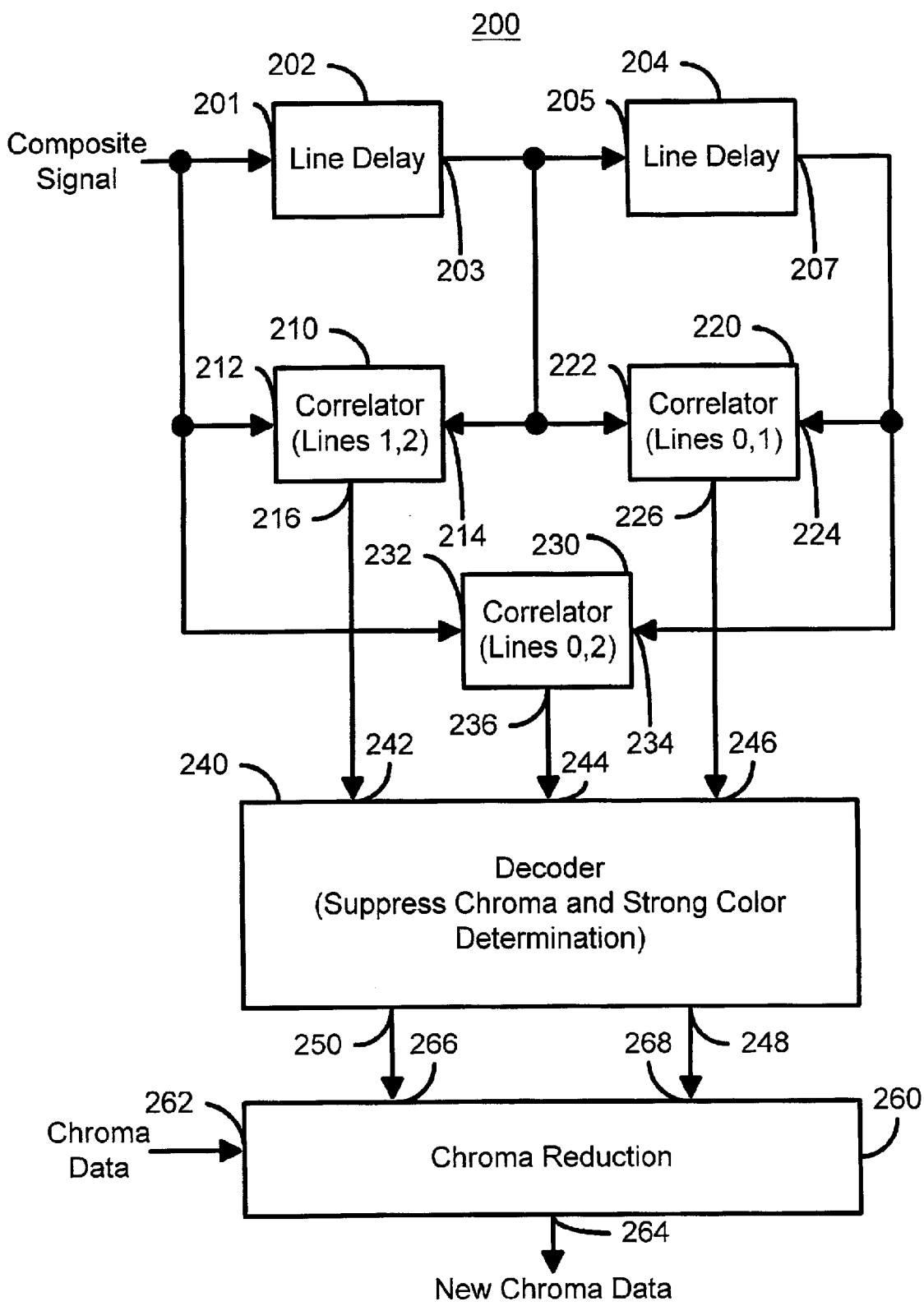
FIG. 3 is a block diagram depicting one embodiment of a system in accordance with the present invention for correcting the separation of luma and chroma data.

FIG. 3 is a block diagram depicting one embodiment of a system 200 in accordance with the present invention for correcting the separation of luma and chroma data. The system 200 includes line delays 202 and 204. Each line delay 202 and 204 includes an input 201 and 205, respectively and an output 203 and 207, respectively. Each line delay 202 and 204 provides a delay equal to a line. Thus, the composite signal at the output 207 of the line delay 204 corresponds to a first line (line 0). The composite signal at the output 203/input 205 of the line delay 202/204 is a first subsequent line (line 1). The composite signal at the input 201 of the line delay 202 is the second subsequent line (line 2).

The system 200 also includes correlators 210, 220 and 230. The correlators 210, 220 and 230 are coupled with the line delays 202 and 204. The correlator 210 is coupled to the input 201 of the line delay 202 through input 212 and to the output/input 203/205 of the line delay 202/204 through input 214. Thus, the correlator 210 correlates the composite signals for line 0 and line 1. The correlator 220 is coupled to the output/input 203/205 of the line delay 202/204 through input 222 and to the output of the line delay 204 through input 224. It Thus, the correlator 220 correlates the composite signals for line 1 and line 2. The correlator 230 is coupled to the input 201 of the line delay 202 through input 232 and the output 207 of the line delay 204 through input 234. Thus, the correlator 230 correlates the composite signals for line 0 and line 2.

Figure 4:
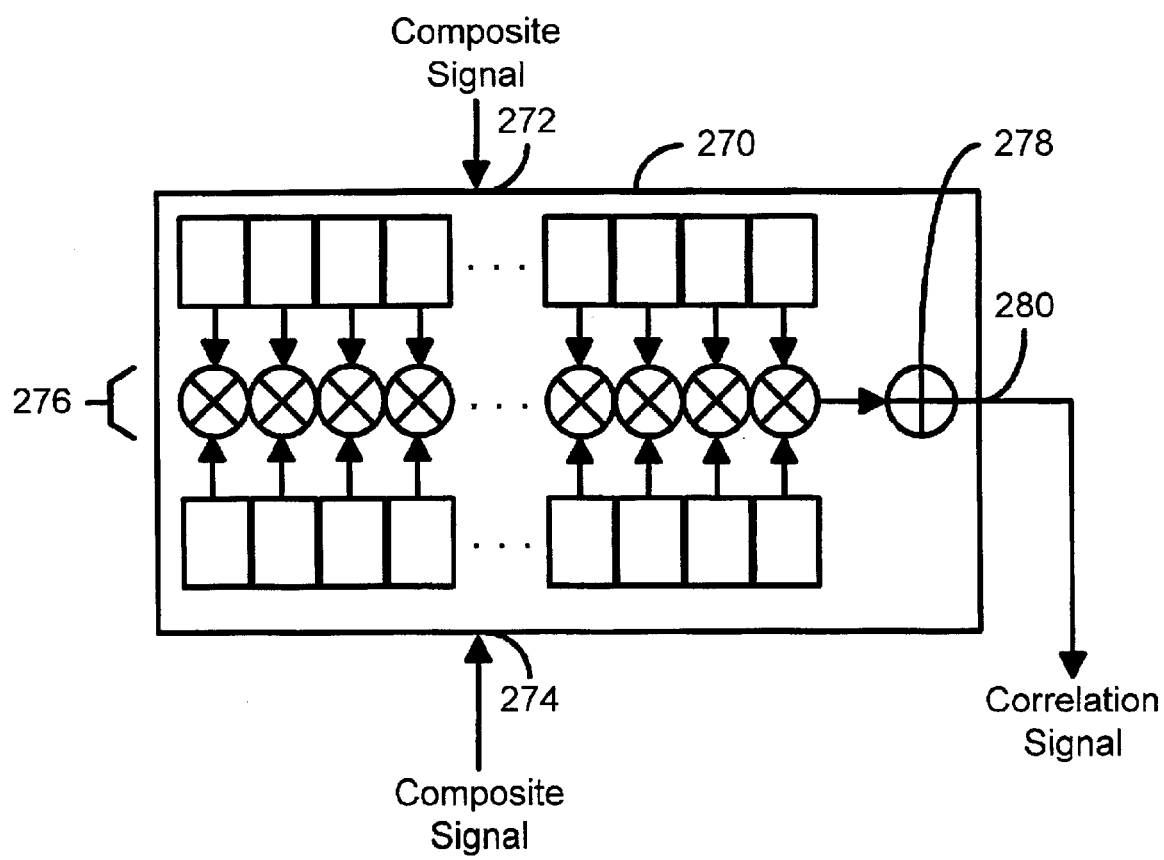
FIG. 4 is a block diagram of one embodiment of a correlator in accordance with the present invention.

FIG. 4 is a block diagram of one embodiment of a correlator 270 in accordance with the present invention. The correlator 270 is preferably used for the correlators 210, 220 and 230. The correlator includes inputs 272 and 274, multipliers 276, adder 278 and output 280. The correlator 270 has inputs 272 and 274 for the composite signal for two different lines. The correlator 270 takes samples from the two different lines and multiplies the samples together. Thus, the correlator includes multipliers 276 that multiply corresponding samples from the different lines to provide products. Although only eight multipliers 276 are shown, another number can be used. In a preferred embodiment, each of the multipliers 276 corresponds to a different sample from the composite signals. The products are added by adder 278 to provide a correlation signal. For example, when the correlator 270 is used as the correlator 210, the composite signal for the first line is provided through the input 272, the composite signal for the first subsequent line is provided through input 274 and the first correlation signal is output via the output 280. Thus the inputs 272 and 274 and the output 294 correspond to the inputs 212 and 214 and the output 216, respectively.

Referring back to FIG. 3, the correlation signals from the output 216, 226 and 236 of the correlators 210, 220 and 230, respectively, are provided to a decoder 240 via inputs 242, 244 and 246, respectively. The decoder 240 utilizes the first, second and third correlation signals to determine the value of a suppress chroma signal and, in a preferred embodiment, a strong color signal. The suppress chroma and strong color signals are described above. Thus, the decoder 240 preferably uses the conditions outlined in Table 1 and Table 2 to determine the values of the suppress chroma signal and the strong color signal. The decoder 240 outputs the suppress chroma signal via output 250 and the strong color signal via output 248. The suppress chroma signal output via the output 250 is a 1 when the decoder 240 indicates that the chroma signals should be suppressed and a 0 otherwise. Similarly, the strong color signal provided via the output 248 is a 1 when the decoder 240 indicates that there is sufficient correlation between lines and a 0 otherwise.

Figure 5A:
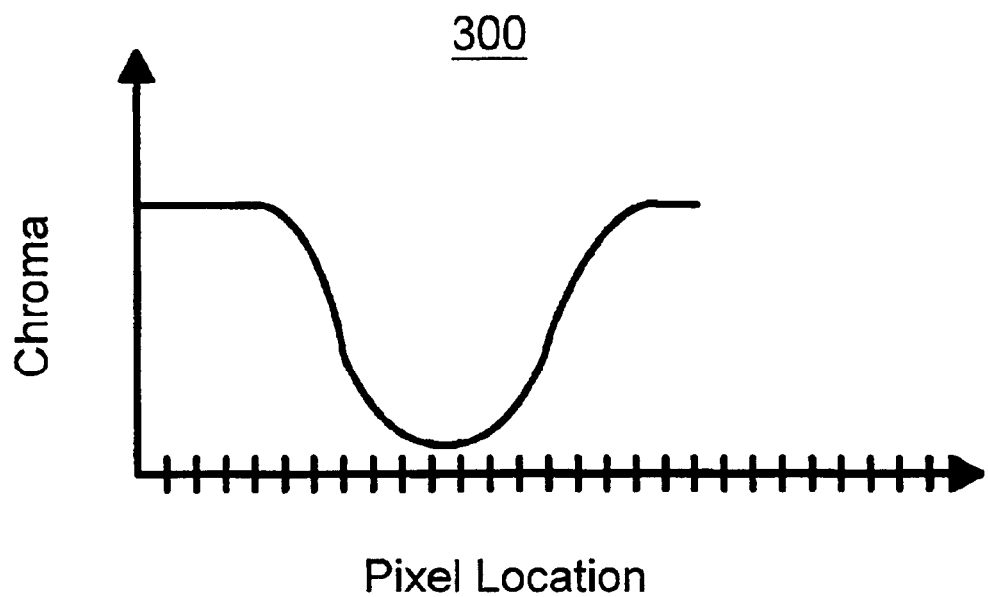
FIG. 5A is a graph depicting one embodiment of the suppression of chroma data provided when the chroma signal is 1 while the strong is 0.
Figure 5B:
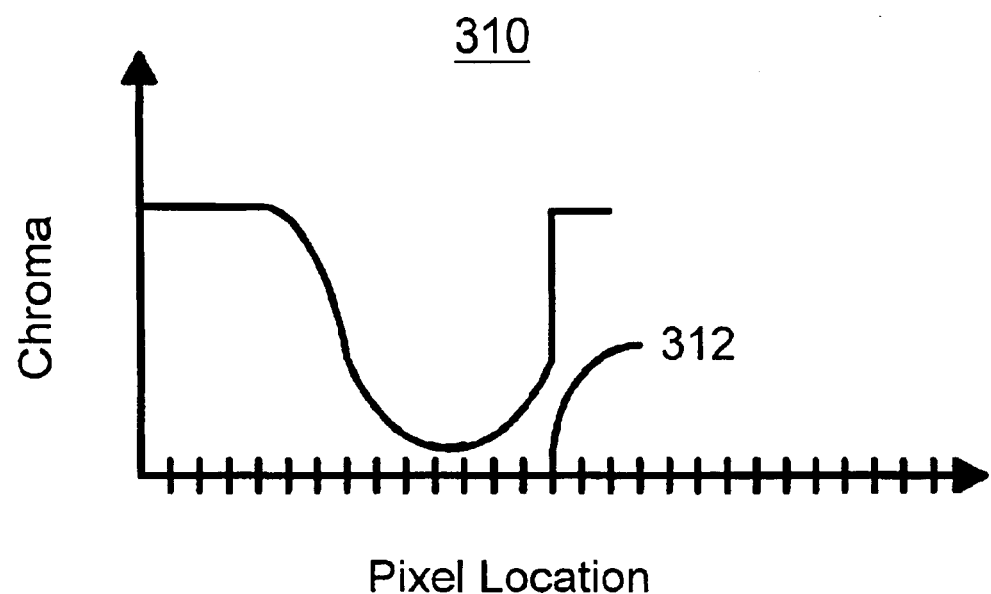
FIG. 5B is a graph 310 depicting the suppression of chroma data provided when the strong color signal becomes a 1 over the range in which suppression would other wise occur.

The outputs 248 and 250 are coupled to the inputs 266 and 268 of a chroma reduction block 260. The chroma reduction block 260 also includes input 262 for receiving a chroma signal and an output 264. The chroma reduction block 260 uses the suppress chroma signal and the strong color signal to determine whether to suppress a portion of the chroma signal. The chroma reduction block 260 will suppress a portion of the chroma signal provided via the input 262 if the suppress chroma signal is 1 while the strong color signal is 0. The chroma reduction block 260 preferably reduces the chroma signal over a range when the suppress chroma signal is a 1 while the strong color signal is a 0. However, if the strong color signal becomes a 1 in the range that the chroma reduction block 260 is suppressing the chroma signal, then in a preferred embodiment, the chroma reduction block 260 stops suppression of the chroma signal. For example, FIG. 5A is a graph 300 depicting one embodiment of the suppression of chroma data provided when the chroma signal is 1 while the strong is 0. FIG. 5B is a graph 310 depicting the suppression of chroma data provided when the strong color signal becomes a 1 (pixel location 312) over the range in which suppression would other wise occur. Note that although the graphs 300 and 310 show continuous curves, the chroma data actually resides only at individual pixels and can thus be considered to be made up of descrete chroma signals at each pixel. Thus, the new chroma signal provided over the output 264 of the chroma reduction block 260 has the chroma data suppressed in regions where there should be no color. As a result, errors which result in the mixing of chroma and luma data, such as the presence of luma data in chroma data where there should be little or no chroma data, can be accounted for.

A method and system has been disclosed for correcting errors in the separation of luma and chroma data from a composite signal. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for correcting luma data and chroma data from a composite signal for a plurality of lines, the method comprising the steps of:

(a) correlating line data of the composite signal from a portion of the plurality of lines to provide a plurality of correlation signals;

(b) generating a chroma suppression signal based on the plurality of correlation signals, the chroma suppression signal for indicating whether to suppress a portion of the chroma data, the chroma suppression signal indicating that the portion of the chroma data should be suppressed when a large luma transition and the chroma data being beneath a threshold are detected.

2. The method of claim 1 further comprising the step of:

(c) suppressing the portion of the chroma data when the chroma suppression signal indicates the portion of the chroma data should be suppressed.

3. The method of claim 2 wherein the suppressing step (c) further includes the step of:

(c1) reducing an amplitude of the portion of the chroma data.

4. The method of claim 3 wherein the amplitude reducing step (c1) further includes the steps of:

(ci1) reducing an amplitude of the portion of the chroma data a plurality of amounts.

5. The method of claim 1 further comprising the step of:

(c) generating a strong color signal based on the plurality of correlation signals, the strong color signal for indicating whether the chroma data is above a second threshold.

6. The method of claim 5 further comprising the step of:

(d) suppressing the portion of the chroma data only when the chroma suppression signal indicates the portion of the chroma data should be suppressed and the strong color signal indicates that chroma data is below the second threshold.

7. The method of claim 1 wherein the correlating step (a) further includes the steps of:

(a1) correlating first line data of the composite signal with first subsequent line data of the composite signal to provide a first correlation signal;

(a2) correlating the first line data with a second subsequent line data of the composite signal to provide a second correlation signal; and (a3) correlating the first subsequent line data with the second subsequent line data to provide a third correlation signal.

8. The method of claim 1 further comprising the step of:

(c) generating a strong color signal based on the first correlation signal, the second correlation signal and the third correlation signal, the strong color signal for indicating whether the chroma data is above a second threshold.

9. A system for correcting luma data and chroma data from a composite signal for a plurality of lines, the system comprising:

at least one correlator for correlating line data of the composite signal for a plurality of lines to provide a plurality of correlation signals;

a decoder, coupled to the at least one correlator, for generating a chroma suppression signal based on the plurality of correlation signals, the chroma suppression signal for indicating whether to suppress a portion of the chroma data, the chroma suppression signal indicating that the portion of the chroma data should be suppressed when a large luma transition and the chroma data being beneath a threshold are detected.

10. The system of claim 9 further comprising:

a chroma reduction block, coupled to the decoder, for suppressing the portion of the chroma data when the chroma suppression signal indicates the portion of the chroma data should be suppressed.

11. The system of claim 10 wherein the chroma reduction block further reduces an amplitude of the portion of the chroma data.

12. The system of claim 11 wherein the chroma reduction block reduces the amplitude of the portion of the chroma data by a plurality of amounts.

13. The system of claim 9 wherein the decoder further generates a strong color signal based on the plurality of correlation signals, the strong color signal for indicating whether the chroma data is above a second threshold.

14. The system of claim 13 further comprising a chroma reduction block for suppressing the portion of the chroma data only when the chroma suppression signal indicates the portion of the chroma data should be suppressed and the strong color signal indicates that chroma data is below the second threshold.

15. The system of claim 9 wherein the at least one correlator further correlates first line data of the composite signal with a first subsequent line data of the composite signal to provide a first correlation signal, correlating the first line data with second subsequent line data of the composite signal to provide a second correlation signal and correlating the first subsequent line data with the second subsequent line data to provide a third correlation signal; and wherein the decoder generates the chroma suppression signal based on the first correlation signal, the second correlation signal and the third correlation signal.

16. The system of claim 15 further comprising:

a first line delay having a first input and a first output, the input for receiving the composite signal;

a second line delay having a second input coupled to the first input and a second output;

the first input, the first output and the second output being coupled with the plurality of correlators, the first input providing the second subsequent line, the first output providing the first subsequent line and the second output providing the first line.

* * * * *